United States Patent [19]

Sugiyama et al.

[11] Patent Number: 4,648,723
[45] Date of Patent: Mar. 10, 1987

[54] STATIC PRESSURE AIR SURFACE STAGE

[75] Inventors: Sadao Sugiyama, Shiga; Hiroshi Goto, Suita, both of Japan

[73] Assignee: Omron Tateisi Electronics Co., Kyoto, Japan

[21] Appl. No.: 756,118

[22] Filed: Jul. 18, 1985

[30] Foreign Application Priority Data

Jul. 23, 1984 [JP] Japan .................................. 59-153676

[51] Int. Cl.$^4$ ......................... F16C 17/26; F16C 32/06
[52] U.S. Cl. .......................................... 384/9; 384/12
[58] Field of Search .............. 308/5 R, 3 R, 6 C, 3 A; 384/100, 9, 12, 13

[56] References Cited

U.S. PATENT DOCUMENTS

| 3,484,064 | 12/1969 | Koenig, III | 308/3 R X |
| 3,582,159 | 6/1971 | Uhtenwoldt | 384/100 X |
| 4,118,101 | 10/1978 | Teramachi | 308/6 C |
| 4,384,859 | 5/1983 | Teramachi | 308/6 C X |
| 4,417,770 | 11/1983 | Tucker | 308/5 R X |

OTHER PUBLICATIONS

M. Kanai, et al., "Mechanism for Determining a Fine Position of a Static Pressure Air Float Stage", Mar. 5, 1982.

Primary Examiner—Stuart S. Levy
Assistant Examiner—Thomas R. Hannon
Attorney, Agent, or Firm—Wegner & Bretschneider

[57] ABSTRACT

A static pressure air surface stage for precision locating use, which is built in precision working machines, precision measuring instruments, semiconductor manufacturing apparatuses. All the bearing pads which are used in arrangement by two are integrally constructed so as to simplify the assembly adjustment and stabilize, improve the assembling precision.

1 Claim, 3 Drawing Figures

STATIC PRESSURE AIR SURFACE STAGE

BACKGROUND OF THE INVENTION

The present invention relates to a static pressure air surface stage or a float stage for precision locating use, which is built in precision working machines, precision measuring instruments, semiconductor manufacturing apparatuses.

Conventionally static pressure air bearing guides were often used in this type of XY stage. One example thereof is shown in FIG. 2. A stage portion 13 is placed on the tolerance portion of two movable guides 11, 12 which are orthogonal in different stage with respect to each other. Eight air bearing pads 14 are oppositely disposed between the movable guides 11, 12 so that the movable guides 11, 12 and a surface plate are placed in non-contact relation.

Also, a linear motor 16 for driving the stage portion 13 is mounted at both ends of the movable guides 11, 12.

In a surface stage of such construction as described hereinabove, the respective air bearing pads 14 are secured by two as a unit. The detailed construction of the air bearing assembly portion will be described in FIG. 3. However, as the air gap of the air bearing was an amount as small as 5 through 10 µm and the plane degree of the pad face after the assembling operation required 1 through 2 µm, it was very difficult to adjust the assembling operation of these bearing pads 14, which took more time and required more labor.

SUMMARY OF THE INVENTION

Accordingly, an object of the present invention is to provide a static pressure air surface stage or a float surface wherein all the bearing pads which are used in arrangement by two are integrally constructed so as to simplify the assembling adjustment and stabilize, improve the assembling precision.

The present invention is characterized in that two bearing pads which are positioned on the same side faces of the movable guides among four bearing pads located on both the sides of the X-axis movable guides are respectively formed integrally formed, two pads which are positioned on the same side faces of the movable guides among four bearing pads located on both the sides of the Y-axis movable guide are respectively formed, furthermore the bearing pad integrally formed in the X-axis direction and the bearing pad integrally formed in the Y-axis direction are integrally formed in the vertical direction.

BRIEF DESCRIPTION OF THE DRAWINGS

This and other objects and features of the present invention will become apparent from the following description taken in conjunction with the preferred embodiment thereof with reference to the accompanying drawings, in which.

DETAILED DESCRIPTION OF THE INVENTION

Figure 1:
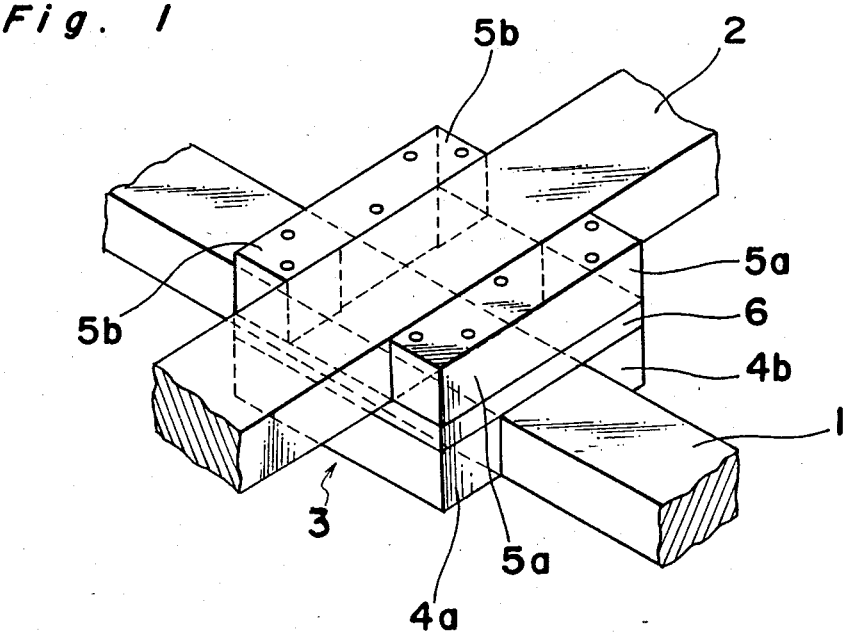
FIG. 1 is a simplified perspective view showing the essential portions of a static pressure air surface stage.
Figure 2:
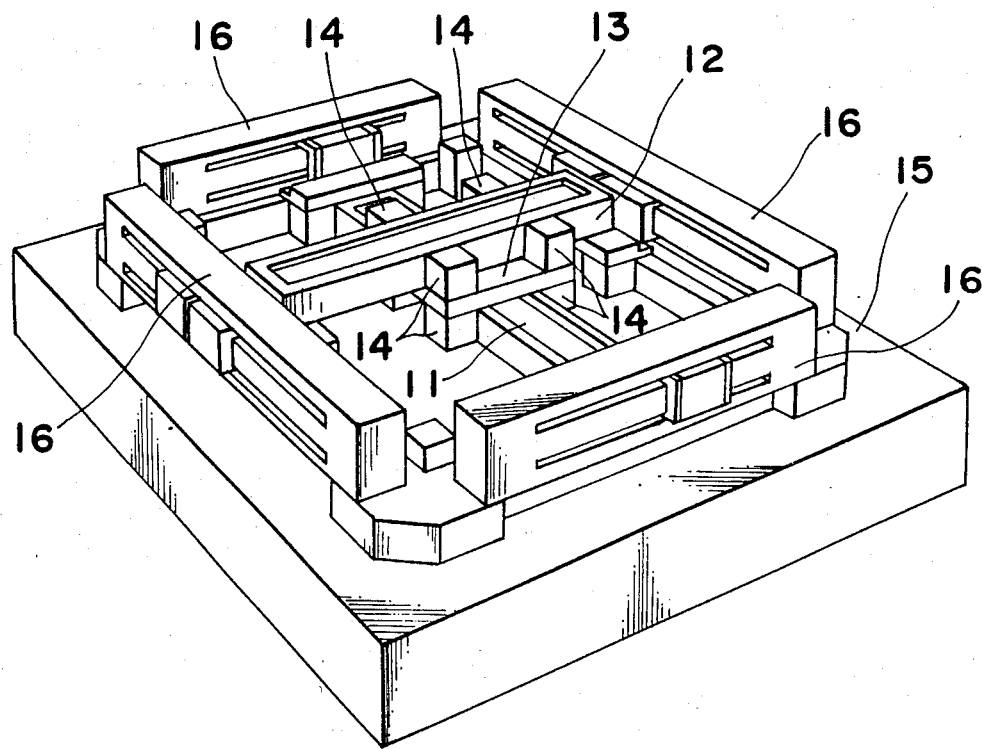
FIG. 2 is a perspective view showing the conventional example.
Figure 3:
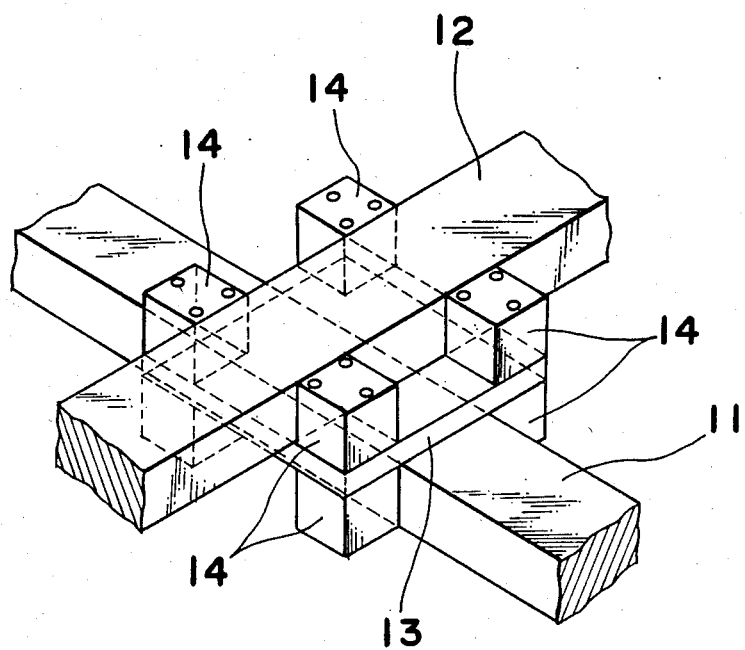
FIG. 3 is a perspective view of the partial portion thereof.

Before the description of the present invention proceeds, it is to be noted that like parts are designated by like reference numerals throughout the accompanying drawings.

The drawings show a static pressure air surface stage. Referring to FIG. 1, a movable guide 1 in a X-axis direction and a movable guide 2 in a Y-axis direction are disposed on different stages of float, surface type on a surface plate 3.

Two bearing pads 4a, 4a; 4b, 4b located on the same side face of the movable guide 1, among four bearing pads 4a, 4a, 4b, 4b positioned on both the sides of the movable guide 1 in the X-axis direction, are integrally formed respectively.

Two bearing pads 5a, 5a; 5b, 5b located on the same side face of the movable guide 2, among four bearing pads 5a, 5a, 5b, 5b provided on both the sides of the movable guide 2 in the Y-axis direction, are integrally formed respectively.

Furthermore, the integrally formed bearing pads 4a, 4b in the X-axis direction and the integrally formed bearing pads 5a, 5b in the Y-axis are integrally formed through a spacer 6 in the vertical direction.

Air blow-off orifices (not shown) are provided on the sides of the movable guide 1 and the surface plate 3 in the above-described bearing pads 4a, 4b, and air blow-off orifices are provided on the side of the movable guide 2 in the bearing pads 5a, 5b so that they are supportingly guided in non-contact relation.

As the adjacent two bearing pads are integrated as described and furthermore all the bearing pads 4a, 4b, 5a, 5b are integrally constructed, the air bearing face which demands the assembling accuracy is determined only by the components accuracy. The troublesome operation of individually assembling the bearing pads to adjust the plane degree as before is not required, thus improving the assembling accuracy. Also, the assembling screws are not shifted, thus stabilizing the accuracy.

In the above-described embodiment, a spacer 6 was used between the bearing pads 4a, 4b and 5a, 5b, but it may be removed.

Also, the location and number of the orifices provided in the bearing pads may be desirably selected and furthermore the outer edge of each bearing pad may be optionally formed.

According to the present invention, two bearing pads located on the same side face of the movable guide are integrally formed, thus simplifying the assembling operation with respect to each movable guide. In addition, the bearing pads of the X-axis movable guide and the Y-axis movable guide are integrated in construction so that the assembling, adjusting operations of the surface stage are simplified and the assembling accuracy is improved, thus improving the stability.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:
1. A static pressure air surface stage comprising:
   a base;
   a first movable guide capable of movement in one linear direction on said base;

a second movable guide capable of movement in a second linear direction on said base perpendicular to said first direction;

two bearing pads located on each side of said first movable guide, two of the bearing pads located on one side of the first movable guide being integrally formed; and two bearing pads located on each side of said second movable guide, two of the bearing pads located on one side of the second movable guide being integrally formed;

wherein the integrally formed bearing pads located on one side of the first movable guide are integrally formed with the integrally formed bearing pads located on one side of the second movable guide.

* * * * *